(12) United States Patent
Candy

(10) Patent No.: US 9,829,598 B2
(45) Date of Patent: Nov. 28, 2017

(54) METAL DETECTOR

(71) Applicant: Minelab Electronics Pty Limited, Torrensville (AU)

(72) Inventor: Bruce Halcro Candy, Torrensville (AU)

(73) Assignee: Minelab Electronics Pty Limited, Torrensville, South Australia (AU)

( * ) Notice: Subject to any disclaimer, the term of this patent is extended or adjusted under 35 U.S.C. 154(b) by 375 days.

(21) Appl. No.: 14/567,849

(22) Filed: Dec. 11, 2014

(65) Prior Publication Data
US 2015/0168584 A1    Jun. 18, 2015

(30) Foreign Application Priority Data

Dec. 12, 2013   (AU) ................................. 2013904851
Jan. 28, 2014   (AU) ................................. 2014900247
Aug. 8, 2014    (AU) ................................. 2014903092

(51) Int. Cl.
*G01V 3/10*     (2006.01)
(52) U.S. Cl.
CPC .................................. *G01V 3/101* (2013.01)
(58) Field of Classification Search
CPC .................................................... G01V 3/101
See application file for complete search history.

(56) References Cited

U.S. PATENT DOCUMENTS

| 4,894,619 A | 1/1990 | Leinonen et al. |
| 7,075,304 B2 | 7/2006 | Nelson |
| 2002/0050822 A1 | 5/2002 | Candy |
| 2005/0104594 A1 | 5/2005 | Nelson et al. |
| 2012/0146647 A1* | 6/2012 | Candy .................... G01V 3/105 324/329 |
| 2014/0265969 A1* | 9/2014 | Vinay ................. H02P 23/0004 318/400.34 |

FOREIGN PATENT DOCUMENTS

| AU | 2010100357 A4 | 7/2010 |
| AU | 2013206236 A1 | 6/2013 |
| AU | 2013101058 A4 | 9/2013 |

* cited by examiner

*Primary Examiner* — Jermele M Hollington
*Assistant Examiner* — Feba Pothen
(74) *Attorney, Agent, or Firm* — The Webb Law Firm

(57) ABSTRACT

A method for reducing unwanted signals, due to a back emf decay, within a receive signal received by a receive coil of a metal detector during a demodulation of the receive signal after a transmission by a transmit coil of the metal detector, including controlling a T/R switch to control a characteristic of the back emf decay to reduce a duration of the period of the back emf decay.

18 Claims, 8 Drawing Sheets

METAL DETECTOR

CROSS-REFERENCE TO RELATED APPLICATIONS

This application claims priority to Australian Patent Application Nos. 2013904851, 2014900247, and 2014903092 filed Dec. 12, 2013, Jan. 28, 2014, and Aug. 8, 2014, respectively, the disclosures of which are hereby incorporated in their entirety by reference.

TECHNICAL FIELD

The present invention relates to metal detectors.

BACKGROUND

The general forms of most metal detectors are either hand-held battery-operated units, conveyor-mounted units, or vehicle-mounted units. Examples of hand-held products include detectors used to locate gold, explosive land mines or ordnance, coins and treasure. Examples of conveyor-mounted units include fine gold detectors in ore mining operations, and an example of a vehicle-mounted unit includes a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or synchronously demodulated, to produce the indicator output signal.

Time domain metal detectors typically include pulse-induction ("PI") or pulse-induction like metal detectors, and rectangular current-pulse metal detectors, wherein the processing of the receive signal includes sampling of the receive signal and/or synchronous demodulation over selected periods, which may include gain weighting of the samples or synchronous demodulation periods.

Time domain metal detectors that require one or more transmit/receive switches (T/R switches) usually have at least a high-voltage period and at least a low-voltage period within a repeating transmit signal cycle. Usually one or more T/R switches operate to have the T/R switches disconnect (open circuit) the receive electronics from the coil during a high-voltage period when the voltage across the coil is relatively high (100~200V, for example), and connect ("short circuit") the receive electronics to the coil during a low-voltage period when the voltage is relatively low (0~2V, for example). In a commonly known arrangement of a PI detector, the low-voltage period is a non-transmitting zero current receive period following a high-voltage "back-emf" period. However, it should be understood that during this non-transmitting zero current receive period, although relatively very small currents are induced in the transmit coil owing to signals received from the environment, nevertheless, a person skilled in the art would consider this a zero transmit current and receiving period.

A T/R switch is used to protect one or more preamplifiers of the receive electronics of a metal detector from a high voltage during the high-voltage period. A T/R switch can also improve signal-to-noise ratio of the receive signal of a PI detector compared to using the damping resistor to isolate the high voltage back-emf from the preamplifier input. While T/R switches are commonly used in a circuit of a metal detector using a same coil for transmission and reception, T/R switches can also be used in a circuit of a metal detector using separate coils for transmission and reception.

Time domain metal detectors that employ T/R switches usually synchronously demodulate (or sample) a receive signal during a low-voltage period after a delay following the transition of a high voltage-period to the low-voltage period. The outputs of the synchronous demodulation are then averaged, usually by means of low-pass filtering, and may also be high-pass filtered. These averaged or filtered signals are then used for further processing, for example, for setting ground balance or for discrimination. The processed signal can then be used to feed an indicator output, for example, an audio response for indicating a target within an influence zone of the transmit magnetic field.

However, it was discovered that known arrangements of one or more T/R switches within a detector create some issues. The present invention addresses one or more of the issues, and improves the performance of a detector.

SUMMARY

According to a first aspect of the present invention, there is provided a method for reducing unwanted signals, due to a back-emf decay, within a receive signal received by a receive coil of a metal detector during a demodulation of the receive signal after a transmission by a transmit coil of the metal detector, the method comprising: generating a repeating transmit signal cycle, each transmit signal cycle comprising a period of non-zero reactive voltage across the transmit coil, followed by a receive period, wherein the period of non-zero reactive voltage across the transmit coil ends after a high-voltage back-emf period within the period of non-zero reactive voltage across the transmit coil, and wherein the back-emf period ends after a period of the back-emf decay within the back-emf period; having a transmit/receive (T/R) switch, capable of changing between a less conductive state and a more conductive state, for protecting transmit coil receive electronics from a high voltage across the transmit coil during the period of non-zero reactive voltage across the transmit coil, and for allowing the transmit coil receive electronics to receive the receive signal during the receive period; controlling the T/R switch to control a characteristic of the back-emf decay to reduce a duration of the period of the back-emf decay; and controlling at least one characteristic of the period of non-zero reactive voltage across the transmit coil such that a current through the transmit coil and a voltage across the transmit coil approaches zero at a same time at the end of the back-emf decay to reduce the unwanted signals during the demodulation of the receive signal.

In one form, the receive period is a period of zero current through the transmit coil. In one form, the transmit coil and the receive coil are the same coil. In one form, the T/R switch changes from a less conductive state to the more conductive state at the commencement of the period of the back-emf decay.

In one form, an output of the T/R switch is connected to a resistor whose resistance is selected to produce approximate critical damping when the T/R is in a more conducting state.

In one form, the input admittance of the transit-receive switch maybe linear or non-linear.

In one form, the method further comprising: having a negative feedback loop which uses, as an input, a signal derived from an output of the T/R switch measured during a period shortly after or immediately following the termination of the back-emf decay, to control at least part of the non-zero reactive voltage across the transmit coil.

In one form, each transmit signal cycle comprises two or more time-separated non-zero reactive periods; and a different negative feedback loop associated with each of the two or more different non-zero reactive periods.

In one form, the input to the negative feedback loop includes a demodulation function that demodulates during the receive period, wherein the demodulation function is selected to be approximately balanced to one or both of log-uniform resistive viscous remanent magnetism soil components and uniform half-space soil components.

In one form, the demodulation function is balanced to d.c. signals.

In one form, the step of controlling the transmit-receive switch includes changing the transmit-receive switch from a less-conducting state to the more-conducting state to initiate the back emf decay.

In one form, the step of controlling the transmit-receive switch includes changing the transmit-receive switch from a less-conducting state to the more-conducting state during the period of the back emf decay.

In one form, an input admittance of the transit-receive switch is selected to control a characteristic of the back emf decay.

According to a second aspect of the present invention, there is provided metal detector configurable to perform the method of the first aspect and its various forms.

According to a third aspect of the present invention, there is provided a computer-readable medium including instructions to perform the method of the first aspect and its various forms.

BRIEF DESCRIPTION OF DRAWINGS

Embodiments of the present invention will be discussed with reference to the accompanying drawings wherein.

DESCRIPTION OF EMBODIMENTS

Figure 1:
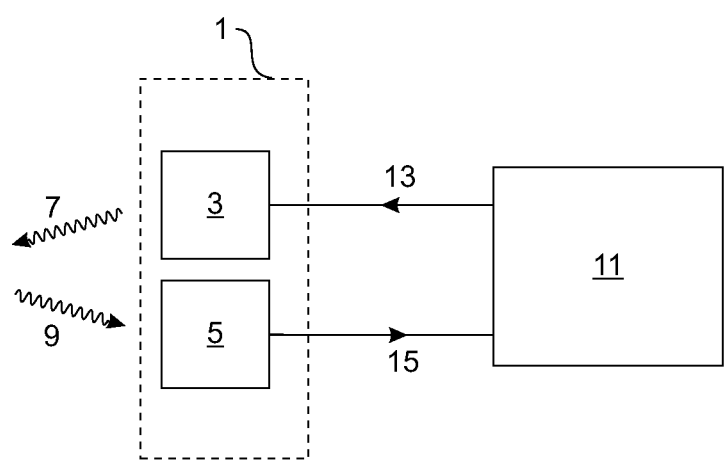
FIG. 1 depicts a schematic diagram of a conventional metal detector.

Referring now to FIG. 1, there is shown a schematic diagram of a conventional metal detector. The metal detector includes a metal detector sensing head 1, which houses a magnetic field transmitter 3 and a magnetic field receiver 5. In response to a transmitted signal 13 from a processor 11, the magnetic field transmitter 3 transmits a magnetic field 7. When the transmitted magnetic field 7 is in the vicinity of a metal object (not shown), the transmitted magnetic field 7 induces an electric current within the metal object, creating a received magnetic field 9 that is detected by the magnetic field receiver 5. A received signal 15 is returned to the processor 11, which produces a signal indicating that a metal object has been detected.

It was discovered that some of the limitations of currently produced time domain detectors that are slightly exacerbated by presently employed T/R switches. The main one is the limitation of electronics in detecting fast time constant targets requiring that receive synchronous demodulation commences as soon as possible after the cessation of the high-voltage back-emf period, because fast time constant targets produce signals that decay rapidly to zero following the back-emf period. However, synchronous demodulation as soon as possible after the back-emf period has various problems:

1. Slow recovery of the electronics after overload; saturation from overload; possible preamplifier slew-rate limitations; and glitches from switching on the T/R switch, and
2. The transfer function of the receive coil (which can be the same coil as the transmit coil) causing unwanted spurious signals to be included in the demodulated signals, especially when the coil is passed over magnetic soils, modulating the inductance of the coil.

The first problem can be reduced by turning on the T/R switch as soon as possible after the voltage level of the back-emf drops to within a level that is safe for the input of the preamplifier.

The second problem is more complicated and is explained below. Suppose that the transmit coil and receive coil are the same coil; the coil is critically damped by a resistor P; the effective series resistance of the driving electronics during the low-voltage magnetic energising period plus that of the coil=R; the coil inductance=L; the low-voltage magnetic energising period is switched to the coil for a period T with −V Volts being the effective low voltage applied across L in series with R; at the termination of the low-voltage magnetic energising period, the high-voltage back-emf period is clamped at U Volts; then the peak current immediately before the back-emf is:

$$I_{peak} = -\frac{V}{R}(1 - e^{-WT}),$$

where W=R/L, ignoring P
and the duration of the high-voltage back-emf period is approximately:

$D = -I_{peak}L/U$, again ignoring P.

As $$\frac{dI_{peak}}{dL} = -\frac{VT}{L^2}e^{-WT}, \text{ and } \frac{dD}{dL} = -dLI_{peak}/(UdL) = -\frac{I_{peak}}{U} + \frac{VT}{UL}e^{-WT},$$

the termination of the high-voltage back-emf period varies as the coil inductance varies when the coil is passed over magnetic soils. As expected, this adverse effect is effectively zero if W is very small (long transmit coil circuit time-constant during the energising applied low-voltage period), but in practice, the coil inductance may vary up to about 1% or so for the more extremely magnetically permeable soils, and transmit pulse lengths maybe comparable with the time constant of the transmit coil drive electronics.

The back-emf decay, following clamping to U Volts for a critically damped coil with an effective parallel capacitance of C, is $$Ue^{-\omega t}(1+\omega t) \text{ where } \omega = \frac{1}{\sqrt{LC}} \text{ and } P = 0.5\sqrt{\frac{L}{C}},$$

where t=0 at the termination of the clamped back-emf period and the coil current is $$-\frac{U}{R}e^{-\omega t}(1+0.5\omega t).$$

Figure 2:
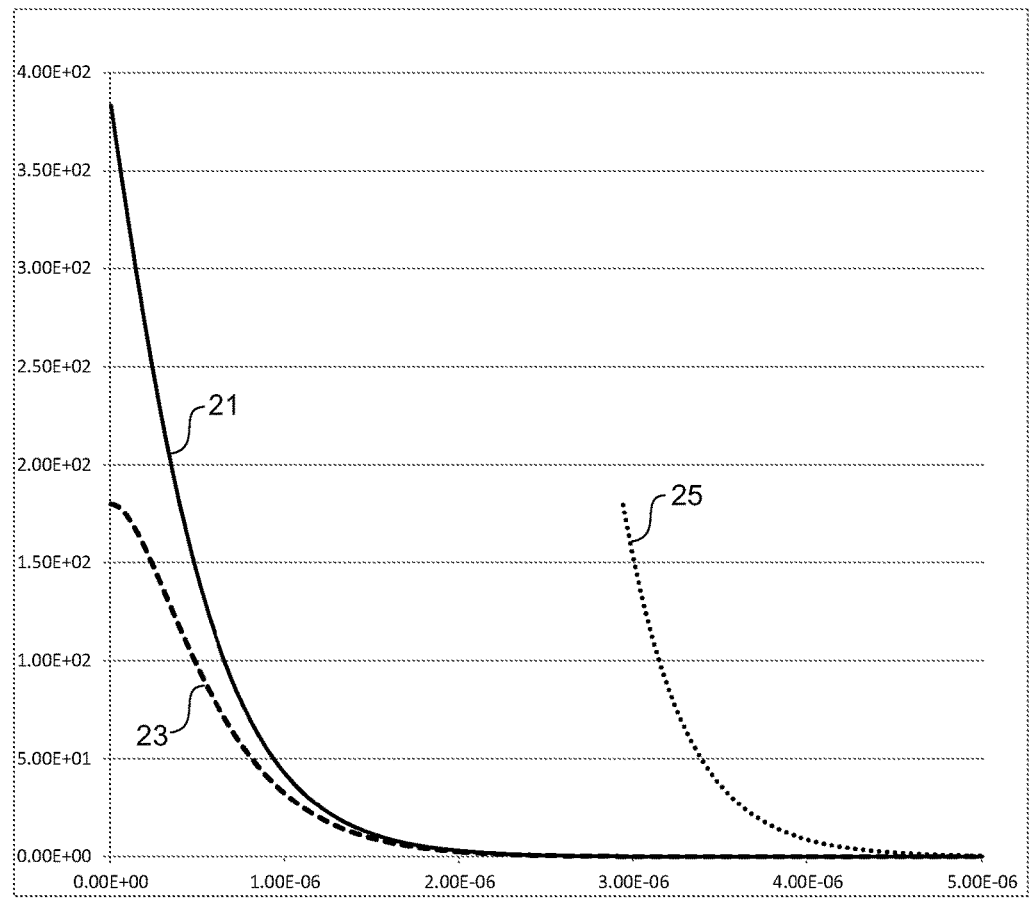
FIG. 2 depicts a critically damped back-emf decay.

These functions are shown in FIG. 2. In these equations, the series resistance of the coil is ignored.

These functions are also affected by varying inductance of the transmit coil due to the modulation of magnetic soils as the coil is passed over the soil. Hence, both the duration of the back-emf period, clamped to U Volts, and the shape of the back-emf decay, vary as a coil is passed over magnetic soils, and if the moment of adequate decay of the voltage across the coil is extended enough from its nominal moment, the receive synchronous demodulation commences before the back-emf has effectively "fully" decayed and a spurious signal from the back-emf decay will result from that modulation of the coil inductance; this assumes that the detector is ground balanced to resistive soil signal components such as all saline or VRM soil components.

This patent seeks to reduce such limitations and thus improve the detection of fast time constant targets by reducing the spurious responses due to magnetic soils.

Traditional PI T/R switches usually consist of high-voltage, low-power FETs that are connected between the transmit/receive coil and the input of the receive preamplifier, with a resistor selected for critical damping is usually connected across the transmit coil. If a receive coil that is separate from the transmit coil is used, it is critically damped with another resistor.

An alternative system to this is disclosed in US2012146647, in which the T/R switch is intrinsically part of the switching transmit circuitry, and through which the transmit coil current flows. One end of T/R switch is connected to the receive preamplifier input and the maximum voltage constrained so as not to damage the preamplifier. During the transmit signal period, the transmit circuit that drives the coil has low impedance, and negative feedback loops are employed to ensure that when the T/R switch opens, no longer to short the preamplifier input to ground or to some low voltage source, any residual current flowing through the coil is approximately zero. In effect, the negative feedback loop controls one of the non-zero reactive transmit coil transmit periods, for example, the high-voltage period, such that when the coil current becomes approximately zero, the T/R switch opens; this constrains the coil voltage at the preamplifier input to one or two forward diode voltage drops and, in effect, a damping resistor is connected across the coil to ensure that any residual coil current is critically damped.

The problem with this approach is that semiconductor devices, through which peak transmit coil currents flow, typically have relatively high capacitances, increasing the time constant of the transfer function of the coil and corresponding electronics.

FIG. 2 depicts a critically damped back-emf decay 23, with time (t) represented along the x-axis, with t=0 when the back-emf falls below the clamped back-emf voltage, in this example, 180V. Trace 21 represents an absolute value of a coil current through the transmit coil, in mA. Also shown is the voltage of the damped back-emf decay 23, magnified by 1000 times 25, and hence for this magnified trace 25, the y-axis is scaled in mV. As a typical PI metal detector preamplifier gain may be of the order of 100, this indicates that at about t=4 µs, the output of the preamplifier is of the order of hundreds of mV, more than enough to create interferences. The decaying emf drops below the typical effective noise of contemporary preamplifiers (taking the effective synchronous demodulator bandwidth into account), at about 9 µs. Given non-ideal electronics (recovery from overload, group delay, and especially the charge injection glitch when the T/R switch turns on), in practice, any demodulation before about 10 µs may cause spurious signals from coil inductance modulation as the coil is swept over magnetic soils. The parameters for FIG. 2 are as follows: L=0.3 mH, ω=500 kHz*2π, C=338 pF and P=471Ω.

An alternative solution is disclosed in Australian innovation patent 2013101058. The T/R switch in this patent is wired up like a conventional T/R switch, but instead of the T/R switch being as one skilled in the art would think of as turned "on" (receive mode) or "off" (transmit mode), it acts as a constant current source for the back-emf period until the back-emf drops below a low voltage threshold where after the T/R switch acts as a resistor connecting the coil to the preamplifier input for the zero transmission receive period. A negative feedback loop is employed to control the constant current value, in effect to approximately minimize any residual coil current once the back-emf has decayed to approximately zero and the receive period commenced. However, this patent states no need for any damping resistor, nor any accurate description of the waveforms other than that the back-emf decay is "linear," nor reason why it is possible to obtain near-zero coil current coincidently with near-zero back-emf at the end of the back-emf decay by means of selecting the value of the constant current source connected to the coil. It is understood from this patent that the T/R switch is an operation constant current for the whole of the back-emf period bar the final termination of the back-emf decay. It should be noted that in this innovation patent, if −G is the gain of the preamplifier shown, and +z the gate voltage, then the signal at the coil when the sample and hold samples must have a mean of −z/G, that is not zero, unlike the invention described herein for which zero is mostly suggested.

A novel T/R switch arrangement disclosed herein is also of the form of a more conventional T/R switch, as opposed to being of a form described in US2012146647, but this T/R switch concept also uses a negative feedback loop to control a signal of the transmit waveform (such as a time or magnitude or both), similar to the method that US2012146647 employs to ensure very low residual coil current coincident with the back-emf decay down to near zero Volts. Unlike prior art, however, the T/R switch described herein may be of many different forms, having various non-linear voltage versus current transfer functions, thus having non-linear input admittance, including any constant current of magnitude greater than some selected magnitude, a combination of constant current sources and resistors that are not necessarily switched into the transmit circuit at the same time, and so on.

For this concept, the negative feedback loop has as an input signal, a synchronous demodulation or "sampling" signal of a post-T/R switch signal, possibly amplified, at least a portion of which occurs shortly after the back-emf transmit high-voltage decay period and before the end of any Tx/Rx coil transients, such that the operation of the negative feedback loop causes the said Tx/Rx coil signal transients, when integrated or averaged during the said negative feedback input synchronous demodulation signal period, to be approximately zero, or offset by a selected amount from zero.

In essence, the invention is about reducing unwanted signals, the remnants of a back-emf decay, within a receive signal received by a receive coil, of a metal detector during a demodulation of the receive signal after a transmission by a transmit coil of the metal detector, by having a T/R switch control a characteristic of the back-emf decay, thereby reducing the duration of the period of the back-emf decay. The T/R switch capable of changing between a less conductive state and a more conductive state is employed for protecting transmit coil receive electronics from a high voltage across the transmit coil, and for allowing the transmit coil receive electronics to receive the receive signal. A T/R switch can take many forms, including, one or more or a combination of FET, diode, current source, resistor etc. There may be more than one T/R switch involved, but for simplicity, this specification uses the common term of T/R switch to represent one or more T/R switches in tandem.

In a form, the metal detector generates a repeating transmit signal cycle, each transmit signal cycle comprising a period of non-zero reactive voltage across the transmit coil, followed by a receive period, wherein the non-zero reactive voltage across the transmit coil ends following a high-voltage back-emf period, and wherein the back-emf period ends after a period of the back-emf decay within the back-emf period. It is possible to have each repeating cycle being different, as long as each repeating cycle comprises a period of non-zero reactive voltage across the transmit coil and a receive period. In one form, the period of non-zero reactive voltage across the transmit coil comprises a low-voltage period, known as the energising period, followed by a high-voltage period, known as the back-emf period. In one form, the receive period is a constant-current period during which the reactive voltage across the transmit coil is zero. In one form, the current is zero during the receive period. There may still be, within the receive period, small receive signals and remanent decaying back-emf signals that need to be "ground balanced", in a continual process, as understood by a person skilled in the art.

A negative feedback loop which uses, as an input, a signal derived from an output of the T/R switch measured during a period shortly after or immediately following the end of the back-emf decay, is implemented to control at least part of the non-zero reactive voltage across the transmit coil.

In another form, each transmit signal cycle comprises two different non-zero reactive periods separated by a receive period, and different negative feedback loops are associated with each of the two different non-zero reactive periods. It is possible to have more than two time-separated non-zero reactive periods, each controlled by a negative feedback loop.

The T/R switch is controlled to be in the less conductive state during most of the period of non-zero reactive voltage across the transmit coil, and controlled to change from the less conductive state to the more conductive state during the period of the back-emf decay.

Further, at least one characteristic of the period of non-zero reactive voltage across the transmit coil is controlled such that a current through the transmit coil and a voltage across the transmit coil approaches zero at a same time at the termination of the back-emf decay. The at least one characteristic can be the duration of the period of non-zero reactive voltage, the durations or timing of periods within the period of non-zero reactive voltage, the voltage level during at least part of the period of non-zero reactive voltage, etc.

In another form, one can, instead, adjust the moment of switch-on of the transmit-receive coil to control or change at least one characteristic of the period of non-zero reactive voltage across the transmit coil.

In another form, instead of adjusting the duration of non-zero reactive voltage across the transmit coil, one can fix all parameters during the period of non-zero reactive voltage and adjust a parameter of the T/R switch to adjust its admittance, and turn the T/R switch on at a fixed time during the back-emf period to effect the back-emf decay. In one form, the T/R switch is switched on at the commencement of the back-emf decay.

It is possible to have the transmit coil and the receive coil being the same coil, such as a mono-loop system.

Figure 3:
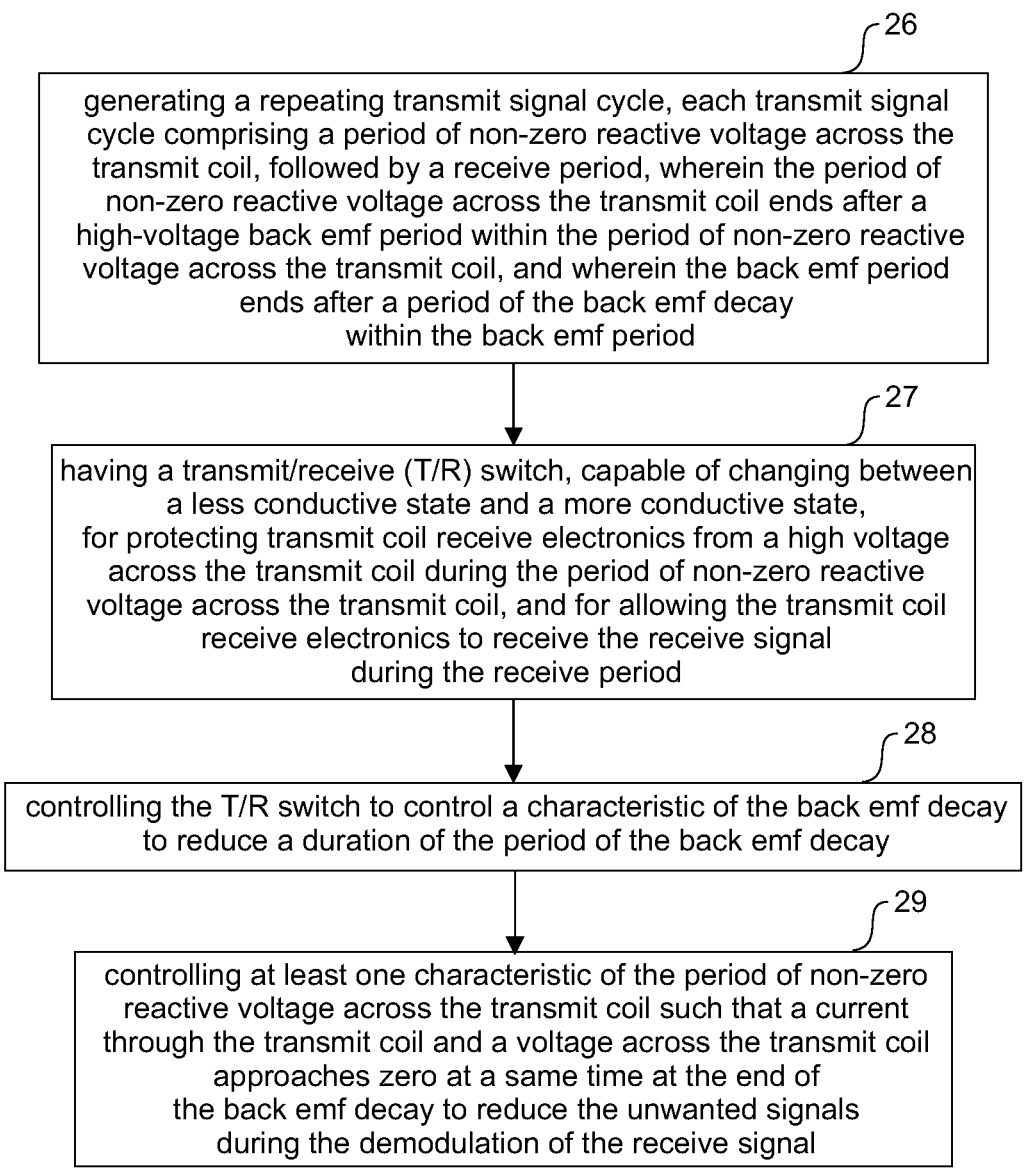
FIG. 3 depicts a broad aspect of one embodiment of the present invention.

FIG. 3 depicts a broad aspect of one embodiment of the present invention. In particular, FIG. 3 shows steps in performing one embodiment of the present invention to reduce unwanted signals due to a back-emf decay, within a receive signal received by a receive coil of a metal detector during a demodulation of the receive signal after a transmission by a transmit coil of the metal detector.

Firstly, step 26 generates a repeating transmit signal cycle, each transmit signal cycle comprising a period of non-zero reactive voltage across the transmit coil, followed by a receive period, wherein the period of non-zero reactive voltage across the transmit coil ends after a high-voltage back-emf period within the period of non-zero reactive voltage across the transmit coil, and wherein the back-emf period ends after a period of the back-emf decay within the back-emf period. A period of non-zero reactive voltage means a period during which there is no change of current through the inductance of the transmit coil. In one form, the period of non-zero reactive voltage includes a low-voltage period followed by a high-voltage period with the high-voltage period being the high-voltage back-emf period. The receive period can be a zero-voltage period, or a zero reactive voltage period with non-zero constant current. The non-zero constant current may be maintained to be of a fixed value from cycle to cycle.

The next step, step 27, is to have a T/R switch, capable of changing between a less conductive state and a more conductive state, for protecting transmit coil receive electronics from a high voltage across the transmit coil during the period of non-zero reactive voltage across the transmit coil, and for allowing the transmit coil receive electronics to receive the receive signal during the receive period. In one way, a less conductive state may be understood as "open state" while a more conductive state may be understood as "closed state" of the T/R switch.

The next step 28 controls the T/R switch to control a characteristic of the back emf decay to reduce a duration of the period of the back emf decay. In one form, the transmit-receive switch is in the less-conducting state during most of the period of non-zero reactive voltage across the transmit coil, and changes from a less-conducting state to the more-conducting state during the period of the back emf decay. In another form, the transmit-receive switch is in the less-conducting state during most of the period of non-zero reactive voltage across the transmit coil, and changes to initiate the period of the back emf decay. In one form, an input admittance of the transit-receive switch is selected to control a characteristic of the back emf decay.

The next step 29 controls at least one characteristic of the period of non-zero reactive voltage across the transmit coil such that a current through the transmit coil and a voltage across the transmit coil approaches zero at a same time at the end of the back-emf decay to reduce the unwanted signals during the demodulation of the receive signal. In one embodiment, the at least one characteristics is at least one of the period of the low-voltage period, the voltage applied to the transmit coil during the low-voltage period, the period of the high-voltage, and the voltage applied to the transmit coil during the high-voltage period, when the when the period of non-zero reactive voltage includes a low-voltage period followed by a high-voltage period.

Figure 4:
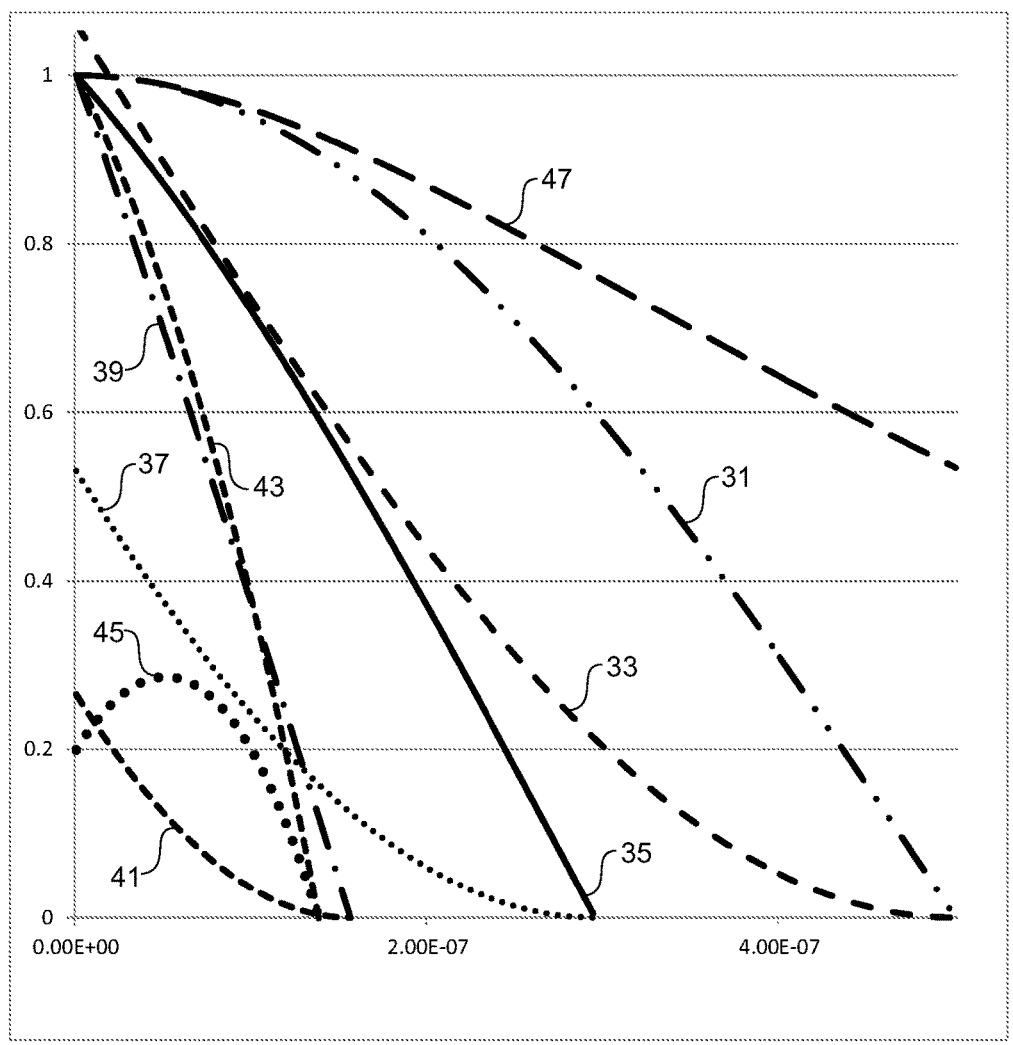
FIG. 4 shows various example T/R switch waveforms for this invention, compared with known techniques.

FIG. 4 shows various examples of T/R switch signal waveforms for this invention. In particular, FIG. 4 shows the effects upon the signal across the receive coil with various T/R switch loads, with the negative feedback loop controlling the coil current at t=0, the commencement of the back-emf decay and when at least some of the coil loading is when the T/R switch load is switched to the coil, in order to cause the back-emf and coil current to reach zero magnitude simultaneously. Note that there is also a curve that shows the transmit current decay of a common PI system in which much of the energy in the transmit coil is dissipated in a resistor selected for critical damping. Descriptions of the curves follow:

- As a reference, that required for the Australian innovation patent 2013101058. This system has the constant current source connected to the coil prior to t=0, as best understood (voltage: trace 31; current: trace 33);
- increasing constant current loads, with the feedback loop ensuring the simultaneous termination of the coil current and back-emf decay (coil voltage with coil current at t=0 equals ωC/2=0.530516e-3: traces 35; coil current with coil current at t=0 equals ωC/2: traces 37; coil voltage with coil current at t=0 equals ωC/4=0.265258e-3: traces 39; coil current with coil current at t=0 equals ωC/4 coil current: traces 41;
- a T/R switch consisting of a parallel constant current source and resistor, where both are switched on by the negative feedback loop at the same time t=0, wherein the resistor is the damping resistor of 470 Ohms and the current source is set to 0.2 mA (voltage: trace 43; current: trace 45);
- Part of the back-emf decay of a conventional PI system for reference with critical resistive damping (trace 47).

The parameters for FIG. 4 are also as follows:
L=0.3 mH,
ω=1000π kHz,
C=338 pF,
P=471 Ω,
U is normalised to 1V for convenience,
Io is the coil current at t=0.

For the figure, the resistor in parallel with the constant current source is P for traces 39 and 45, and both are switched to the coil at t=0. Traces 33, 37, 41, 45 are coil currents and traces 31, 35, 39, 43 are voltages across the coil.

These are just some of the possible waveforms; the transfer function during the back-emf decay may include many different non-linear functions, such as various resistors or constant current sources switched to the coil at different times or other such non-Ohmic or non-constant current transfer functions or combinations of any of the above.

As can be seen, the decay time maybe made arbitrarily short, and have numerous different decay shapes depending on the T/R switch transfer function (input admittance), and all the examples given have back-emf periods which effectively terminate much earlier than that of conventional PI.

If the magnitude of the constant current is set by the feedback loop as per Australian innovation patent 2013101058, then these conditions, the integral, or average, of the Tx/Rx coil signal transients, during the said negative feedback input synchronous demodulation signal period being zero, and the T/R switch constant current being equal to UωC, are satisfied when the voltage waveform is:

$$U\cos(\omega t): \text{ for } t<\pi/2\omega, \text{ and}$$

$$0: \text{ for } t>\pi/2\omega,$$

where U is the clamped back-emf voltage, and t=0 at the commencement of the back-emf decay period, and the current waveform is $$\sqrt{\frac{C}{L}}\,U[\sin(\omega t)-1]: \text{ for } t<\pi/2\omega \text{ and}$$

$$0: \text{ for } t>\pi/2\omega.$$

If the back-emf is not clamped, the constant current needs be set to $I_{peak}/2$ where $I_{peak}$ is the transmit coil current at the commencement of the back-emf period and, ignoring R, the back-emf voltage waveform is $$v=\frac{I_{peak}}{2\omega C}\sin(\omega t),$$

and the current waveform is $$i=-\frac{I_{peak}}{2}[\cos(\omega t)+1].$$

U.S. Pat. No. 7,075,304 does not describe a T/R switch, but rather the use of FETs to act as damping resistors connected across either a receive coil or transmit coil, or both. The resistances of these FETs may be varied through computer control. The patent discloses that a feedback loop may be used to adjust the resistances of the FETs so that the LCR damping coefficient is controlled dynamically so as to maintain critical damping.

In this invention, if the constant current is increased relative to UωC, and switched on at t=0, the commencement of the back-emf is controlled by the negative feedback loop K is the magnitude of the constant current source, and the period between the commencement of the back-emf decay (t=0) and the time that the back-emf decay is completed is t=γ, then:

$$\gamma = \frac{\tan^{-1}[U\omega C/(K-I_0)]}{\omega}$$

and $$K = [U\omega C \sin(\omega\gamma/2) - I_0\cos(\omega\gamma)]/[1-\cos(\omega\gamma)],$$

the decaying back-emf after t=0 is $$U\cos(\omega t) + \frac{I_0}{\omega C}\sin(\omega t)$$

and the coil current is $$i = K[\cos(\omega t)-1] + U\omega C \sin(\omega t) - I_o \cos(\omega t).$$

Table 1 lists to, K and γ to show the trend, for the clamped back-emf U=180V, not normalised to 1V as above.

TABLE 1

| Io | K in mA | γ in μs |
|---|---|---|
| ωC | 191 | 0.500 |
| ωC/1.05 | 191 | 0.484 |
| ωC/1.1 | 193 | 0.470 |
| ωC/1.5 | 207 | 0.374 |
| ωC/2 | 239 | 0.295 |
| ωC/4 | 407 | 0.156 |
| ωC/8 | 776 | 0.079 |
| ωC/16 | 1534 | 0.040 |

As can be seen, setting the constant current near to UωC=191 mA is problematic as dγ/dK approaches infinity. Clearly, switching the T/R switch on instantly results in the shortest back-emf decay period, but care in the design is required in order to comply with EMC emission standards. Thus, the switching transition of the T/R switch when being turned on should be stretched over a period of at least several nanoseconds. In any case, even at high FET gate voltages, FETs behave as slightly errant current sources when the drain voltage and current are high, and behave in an Ohmic manner when the drain voltage is low.

For an explanation, assume that the T/R switch is a small signal FET of low capacitance. It has a non-linear transfer function because of the finite "turn-on" time, and its drain voltage versus drain current, for a given gate voltage, is not an accurate constant current. Because of non-linear FET capacitances as a function of the back-emf, and also below a certain back-emf threshold voltage, any configured "current source" FET within the T/R switch must transition between behaving like a constant current and behaving as a resistance.

However, one skilled in the art would think of the FET acting as a constant-current source if designed as such, or would think of the FET as "instantaneously" "shorting out" the back-emf if fully switched on with such a T/R switch load, the latter, in effect, occurring in US2012146647.

Nevertheless, the negative feedback loop will ensure that the coil current will end at the same time ("γ") as when the back-emf ends. A non-linear function for example, is shown in FIG. 4, namely a decay signal for a T/R switch acting as a constant current source in parallel with a resistor, both switched to the coil at t=0, that is, this coil load is neither a constant current source, nor a resistor.

For all of the examples of T/R switch input admittance loads resulting in the waveforms in FIG. 4, switching on the T/R switch at t=0 causes the back-emf decay period to commence.

Figure 5:
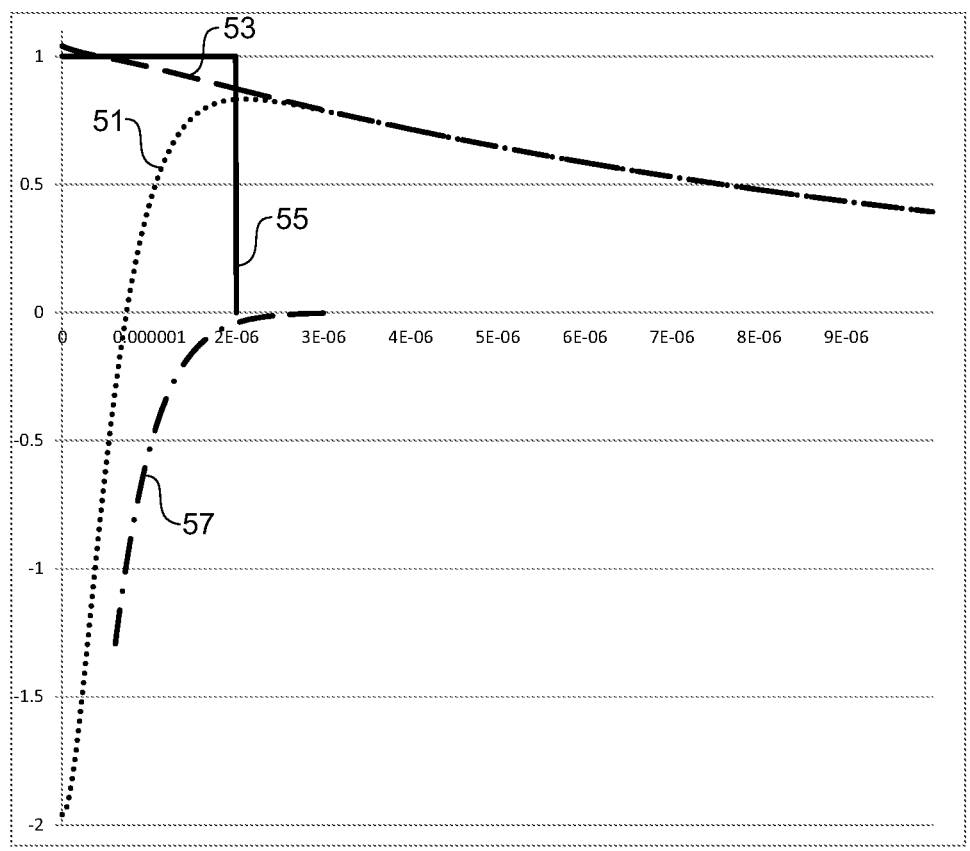
FIG. 5 depicts the receive response for the detector detecting a first order target only.

FIG. 5 is the receive response for the detector detecting a first order target only, its time constant=$L_{targ}/R_{targ}$, where $L_{targ}$ is the target effective inductance connected in parallel with the target effective resistor $R_{targ}$, for the T/R switch switched on "instantaneously" at t=0, or in effect, setting the "constant current" magnitude very high. Trace 53 is for the idealised receive dB/dt response to dB/dt convolved with the transfer function of the coil, for an instantaneous ideal termination of the back-emf period, and mathematically without any need for the negative feedback-loop. Trace 51 merging into trace 53 and continuing as trace 53 is also for dB/dt convolved with the transfer function of the coil, but with the feedback loop operational, and for this the negative feedback loop ensures that the integral during the sampling period (shown by trace 55)=zero, viz, the integral of trace 51=0 averaged over the period when trace 55=1, namely between t=0 to 2 microseconds. The main point of FIG. 5 is that after about 3 microseconds, the transient caused by the negative feedback loop (trace 57; note that trace 57+trace 53=trace 51) practically=0, and thus plays no role in any Rx demodulation after say 3 microseconds. Note that in this example, the negative feedback loop's input signal is synchronously demodulated or "sampled" with unity gain between 0 and 2 microseconds, and zero gain beyond 2 microseconds (represented by trace 55), but many such synchronous demodulation function are possible, for example its magnitude may vary, e.g. it could be say a cosine function from 0 to 90 degrees between 0 and 2 microseconds and 0 thereafter, or some other function to improve s/n, and further, the negative feedback loop's input signal may commence synchronously demodulated after a short delay following t=0, e.g. commencing at say t=0.5 μs. Such a delay may be useful to avoid potential transient overload input signals for example. It is highly prudent to ensure that the negative feedback loop's synchronously demodulated input signal is balanced to d.c. by means of a "d.c. nulling" subtraction later on during the receive period, to ensure both low 1/f noise and insensitivity to induced emfs in the coil from moving the coil relative to static environmental magnetic fields. The d.c. balancing signal may include a demodulation period near the end of the receive period for example.

Similarly, if a soil VRM signal was being detected instead of the first order target in FIG. 5, the feedback loop ensures that the integral=0 for when trace 55=1, and the feedback signal transient will also contribute virtually nothing to the Rx demodulation after 3 microseconds. For example, suppose the transmit signal is due to a pulse induction signal of clamped back-emf U Volts and the PI energising transmit coil pulse applied voltage=-V for a duration T wherein the drive electronics has an effective equivalent series resistance of R and the coil an inductance of L, the reciprocal of the effective time constant of the drive electronics thus being W=R/L. If the duration of the clamped back-emf is D, and if this is followed by a zero transmission receive period of duration T-D, so that the fundamental period of the whole cycle is 2T, then the VRM signal from log-uniform resistive VRM soils is, where t=0 at the termination of the back-emf period:

$$VRMRx\text{ emf} =$$

$$\frac{dB}{dt} \propto \sum_{n=0}^{\infty} \left\{ -Ve^{-W(t+T+D+2nT)} \left( E_1[W(t+T+D+2nT)] - E_1[ \right. \right.$$

$$\left. \left. W(t+D+2nT)] \right) + U\ln\left[\frac{t+D+2nT}{t+2nT}\right] \right\}$$

where $E_i(x)$ is the exponential integral, and where B is the magnetic flux detected by the coil after t=0. While this idealised $$\frac{dB}{dt} \to \infty$$

at t=0, it is not so for a finite back-emf decay time and the idealised form needs to be convolved with the coil transfer function to get the actual theoretical signal across the coil.

However, even if Rx demodulation occurs earlier than 3 microseconds after the end of the back-emf period, it is still possible to ensure reasonable ground balance because the shape of the Rx signal from the VRM decay plus the contribution from the feedback compensating transient will be invariant in form, except for magnitude, from one transmit cycle to the next, assuming that the feedback control input signal cancels out rate of change of environmental static magnetic fields; any receive demodulation ground balancing function sampling so early after the back-emf would need take this into account. However, for this sort of very early receive demodulation, variations in coil inductance become significant in the coil transfer function, and thus can produce spurious signals due to variations of soil permeability.

Referring again to FIG. 5, if the receive demodulation commences at 3 microseconds, and the negative feedback input signal demodulation period of unity gain commencing at t=0, or some non-zero start time, e.g. 0.3 µs, and is varied to terminate at say between 2 to beyond 3 microseconds, the negative feedback transient would have died down to effectively near zero by 3 microseconds, and thus the receive demodulation function would be effectively unaffected by the longer negative feedback input signal demodulation period.

There are constraints on the possible advantageous T/R switch loads over prior art for this invention. For example, if a critically damping or over-damping resistor is permanently connected to the Tx/Rx coil, then connecting any other sort of load, other than a negative impedance, will merely adversely extend the damping period. Similarly, for example, if a T/R switch is a constant current source of magnitude <UωC, the system will not result in both the back-emf decay and coil current both reaching zero simultaneously. However, switching in a resistor that is selected for critical damping, or one lower in value, plus any constant current magnitude, or some other nett effectively lower non-linear load via the negative feedback control, will be of benefit compared to conventional PI resistive damping in reducing the back-emf decay period.

It is possible to form a processed receive signal (synchronous demodulation and filters) that is responsive to resistive components of soil signals, these being well known to those skilled in the art. For example, sampling the Rx signal with a gain of +1 between say 10 and 110 microseconds, and later with a gain of −1, also for a period of 100 microseconds, so that any DC or slow changing signal, say from the rate of change of static magnetic fields whilst the search coil is swung, is cancelled out, and produces a first ground signal. This first ground signal may be fed forward to be subtracted from the input of the feedback control loop, and scaled such that the scaling is selected so that when log-uniform only resistive soil VRM is being detected, the transients due to the feedback loop, described above, are approximately cancelled out. Referring to FIG. 5, if, instead of detecting the example target, soil VRM was being detected, then the integral of this VRM signal from t=0 to 2 microseconds, without any transients from the negative feedback loop, would equate the scaled first ground signal fed forward to the input of the negative feedback loop. This would be equivalent to the area under the trace 53 for the target, in this case between 0 and 2 microseconds and in this case the VRM receive signal. Such a signal subtracted from the input to the negative feedback loop would result in the idealised VRM decay signal with no negative feedback transients, that is the received VRM signal will show no sign of negative feedback transients" being added to it.

Alternatively, the same zero negative feedback transient signal can be achieved by selecting a log-uniform resistive VRM balanced negative feedback loop input synchronous demodulation function, that includes a contribution close to the cessation of the back-emf period, e.g. at least say <1 microseconds, referring to FIG. 5.

For the sake of simplicity, ignore the transfer function of the coil; this is unrealistic, but useful for understanding. It is assumed that the mathematically idealised dB/dt VRM signal shown above is being fed to the input of the negative feedback loop synchronous demodulator. If a demodulation function such as trace 61 shown in FIG. 6 for this example, that has a gain of +1 from 0.4 to 2 microseconds, a gain of −1 from 60 to 114 microseconds, and a gain of +1 from 350 to 402.4 microseconds and 0 at all other times is selected, this will produce a null to log-uniform resistive VRM signals and cancel out any induced emf from changing static magnetic fields passing through the coil as it is moved, and thus will produce no equivalent of the negative feedback compensation transient when detecting VRM soils.

Figure 6:
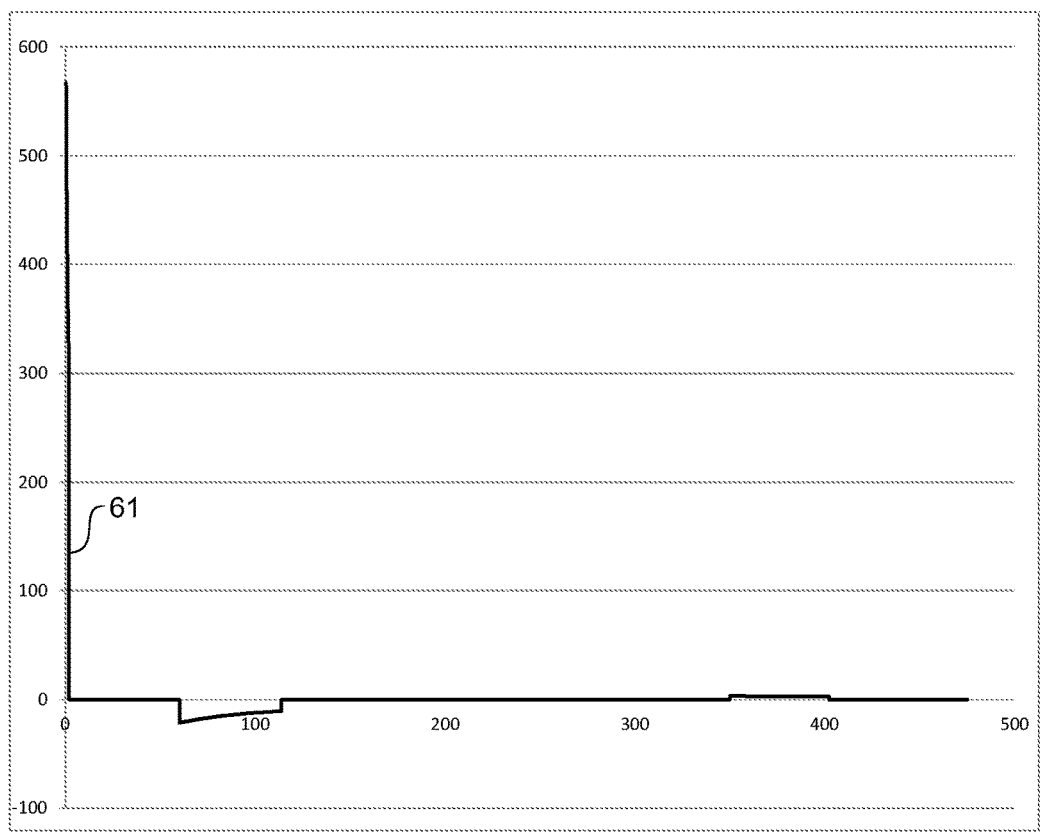
FIG. 6 shows the output viscous remanent magnetism (VRM) signal from the synchronous demodulator for such a demodulation function with the idealised VRM input signal.

FIG. 6 shows the output VRM signal from the synchronous demodulator for such a demodulation function with the idealised VRM input signal. The real VRM signal is the ideal VRM signal convolved with the transfer function of the coil and preamplifier electronics, assuming all else is ideal, and this will require a slightly different demodulation gain function to achieve a null to log-uniform resistive VRM signals and to cancel out any induced emf from changing static magnetic fields passing through the coil as it is moved. To further clarify: with this demodulation function, the input signal will appear as though the transmit signal ended ideally without any spurious transients from the negative feedback loop responding to the VRM signal, and hence, receive path synchronous demodulation may commence very early; the mathematics predicts no deviation from the received VRM signal due action of the negative feedback loop. The limitation is again the problems associated with the modulation of coil inductance and, in practice, transmit electronics noise producing small random levels of residual current that will produce noise within a processed receive signal if the receive demodulation occurs too early after the back-emf decay. For example, suppose that the back-emf is 180 V, the coil has 300 µH inductance and has parameters, such as resonant frequency, as per above, and the peak current during the energising low voltage period is say 3 A, then the duration of the clamped back-emf period is 5 µs.

Suppose further that the negative feedback loop controls this duration. Only 10 ps jitter will cause a residual current noise of 6 μA, or an initial voltage of roughly 3 mV at the termination of the back-emf, assuming that the T/R switch forces the back-emf decay to be very rapid. If the preamplifier has a gain of say 200, then this signal appears as roughly 0.6V at the preamplifier output, which is significant.

Figure 7:
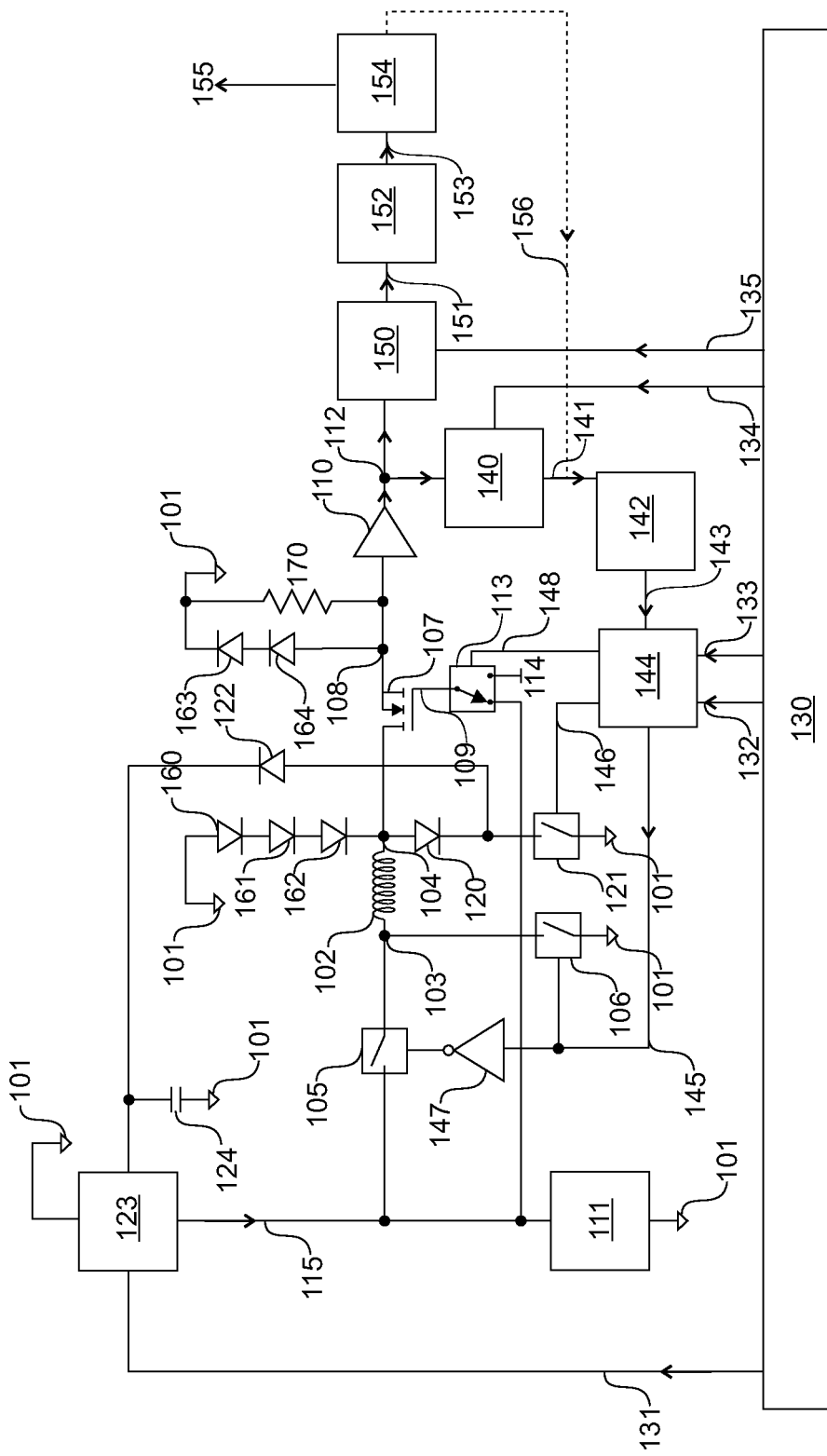
FIG. 7 depicts an exemplary circuit capable of producing a conventional PI transmit waveform, but with the back-emf decay signal being the subject of this invention.

The exemplary circuit shown in FIG. 7 is capable of producing a conventional PI transmit waveform, but with the back-emf decay signal being the subject of this invention. A transmit and receive coil 102 has one end 103 connected to two switches 105 and 106. The other end 104 of transmit and receive coil 102 is connected to the T/R switch 107, shown in this example as a FET, and a diode 120 that is in turn connected to a switch 121. Switches 105, 106 and 121 would typically be low "on" resistance switches and capable of handling several amperes in a typical PI metal detector. Switch 121 and 106 are both connected to the system electrical ground 101, and switch 105 is connected to the output 115 of a power supply 111. The voltage of power supply 111 could be several volts (e.g. 5 to 15V) in a typical PI metal detector. Diode 120 and switch 121 are connected to diode 122 through which the back-emf current discharge flows to capacitor 124 and switch-mode power supply 123. Power supply 111, switch-mode power supply 123, and capacitor 124 are also connected to the system electrical ground 101. The master clock and timing control electronics 130 controls 131 the switch-mode power supply 123 to maintain the voltage across capacitor 124 to a fixed voltage (bar ripple), for example 180V. The power flow is from power supply 111 to the coil as a magnetic field energy that is discharged into capacitor 124 via diode 122 and 120 during the back-emf, and this stored energy in capacitor 124 is transferred back to power supply 111 via the switch-mode power supply 123.

When switch 105 and switch 121 are switched on, and switch 106 switched off, a low voltage from power supply 111 is applied across the coil 102 and the coil current increases. At some moment controlled by the negative feedback loop, switch 105 and switch 121 are switch off and switch 106 is switched on, and the coil back-emf is clamped via diodes 120 and 122 to the voltage across capacitor 124. During the back-emf period, the T/R switch 107 is turned off. At the termination of the back-emf, the T/R switch 107 is switched on via the gate control at 109. This very quickly ensures that the back-emf is clamped down at least to the forward voltage across diodes 164 and 163, diode 163 being connected to the system electrical ground 101. Switch 113 controls the gate voltage of FET 107 at 109, and may either select a voltage at 114, e.g. −5V, to turn the T/R switch FET 107 off, or a voltage at 115 shown in this example circuit, or indeed some other positive voltage, to turn the T/R switch loosely speaking "on," or, to switch the T/R switch into a constant or more accurately speaking, quasi constant current mode.

The T/R switch FET 107 is connected to a preamplifier 110 input at 108. Resistor 170 is connected to the system ground 101, which is selected for critical damping. The output 112 of the preamplifier 110 is connected to the negative feedback loop input synchronous demodulator (or "sampler") 140. This is controlled by a demodulation function at 134. An output 141, of the negative feedback loop input synchronous demodulator 140 is connected to an input of a negative feedback loop amplifier 142. An output 143 of the negative feedback loop amplifier 142 is fed to a pulse width modulator 144 that controls switches 113 via 148, 121 via 146, 106 and 105 via 145, 147 being a simple inverter.

The reference clock timings of the pulse width modulator 144 are at 132 and 133 from the master clock and timing control electronics 130. Two inputs 132 and 133 are shown to emphasize the function of the pulse width modulator 144. At least one controlling the termination of the back-emf, and another the low voltage period and the commencement of the back-emf period.

The negative feedback loop control is described above, and may either control the duration of the low voltage period, or the duration of the back-emf in this example, or indeed both durations. Alternatively, it may be configured to control the back-emf voltage or the low voltage of power supply 111.

Diodes 160, 161 and 162 are for protection purposes, and maybe small signal high voltage types.

Diode 120 is useful to maintain a relatively low electronics capacitance at 104, but besides this function, is not necessary.

The remainder of the receive chain is shown as typical PI electronics: The output 112 of the preamplifier is connected to receive synchronous demodulators 150, and their outputs 151 are connected to filters 152, typically low and high-pass filters. The receive synchronous demodulators 150 are controlled via 135 from the master clock and timing control electronics 130. Outputs 153 of the filters are connected to further processing electronics 154, that could include for example fine adjustments to the ground balance or discrimination. One possible output 156 could be a low pass filtered signal responsive to soil resistive VRM components, a first ground signal. A selected proportion of this may be fed via 156 into the negative feedback loop amplifier 142, as a feed-forward signal to compensate and negate the effects of negative feedback control when VRM signal from soil is being detected as described above. Alternatively, the synchronous demodulation function at 134 may be selected to cancel out VRM components of signal, or saline components, or both, and D.C. components present in the preamplifier 110 output 112, so that the negative feedback loop is responsive only to the intrinsic excess coil current following the back-emf and is independent of either, or both, VRM and saline soil components, and d.c.

The further processing electronics 154 usually includes ADC and DAC circuitry and software and may issue a system indicator output 155 signal.

In order to reduce the transfer function of the transmit coil if used as a receive coil, it is best if the T/R switch FET is controlled by a galvanically isolated gate driver, in order to reduce the T/R switch capacitance presented to the rest of the circuit, so that the T/R switch does not add to the effective coil loading capacitance when the T/R switch is switched on. At the time of writing, either optocouplers or magnetic digital isolators, such as Agilent HCPL-9000, Analogue Devices AduM1100BR, or NVE IL710, may be used to isolate galvanically the T/R switch such that only a few pF stray capacitance is presented to the rest of the circuit.

Part or all of the negative feedback system may be implemented in software or hardware, as may also any of the receive electronics.

In an alternative embodiment, the input admittance of the transmit-receive switch may be controlled to change to different values during the back-emf decay, either as distinct changes at particular times, or as a function of the back-emf voltage, or, continuously. For example, the current source value may be increased during the back-emf decay by increasing the voltage at 109 of the gate of FET 107 during the back emf decay. The current source value may be a function of the back-emf voltage and/or, time.

The fundamental transmit waveform period may consist of several zero transmission periods, during which receive synchronous demodulation occurs, following different transmission periods. An individual negative feedback loop like that described above is required for each different transmit waveform within the fundamental period. For example, within a fundamental transmit period, suppose three identical transmit waveforms are transmitted, separated by non-transmission receive periods, and these are followed by a single different waveform transmit period, also separated from the other transmit periods by non-transmission receive periods, then at least two negative feedback loops are required, one for the three identical transmit waveforms, and another for the single different waveform, each controlling the T/R switch as described herein.

Figure 8:
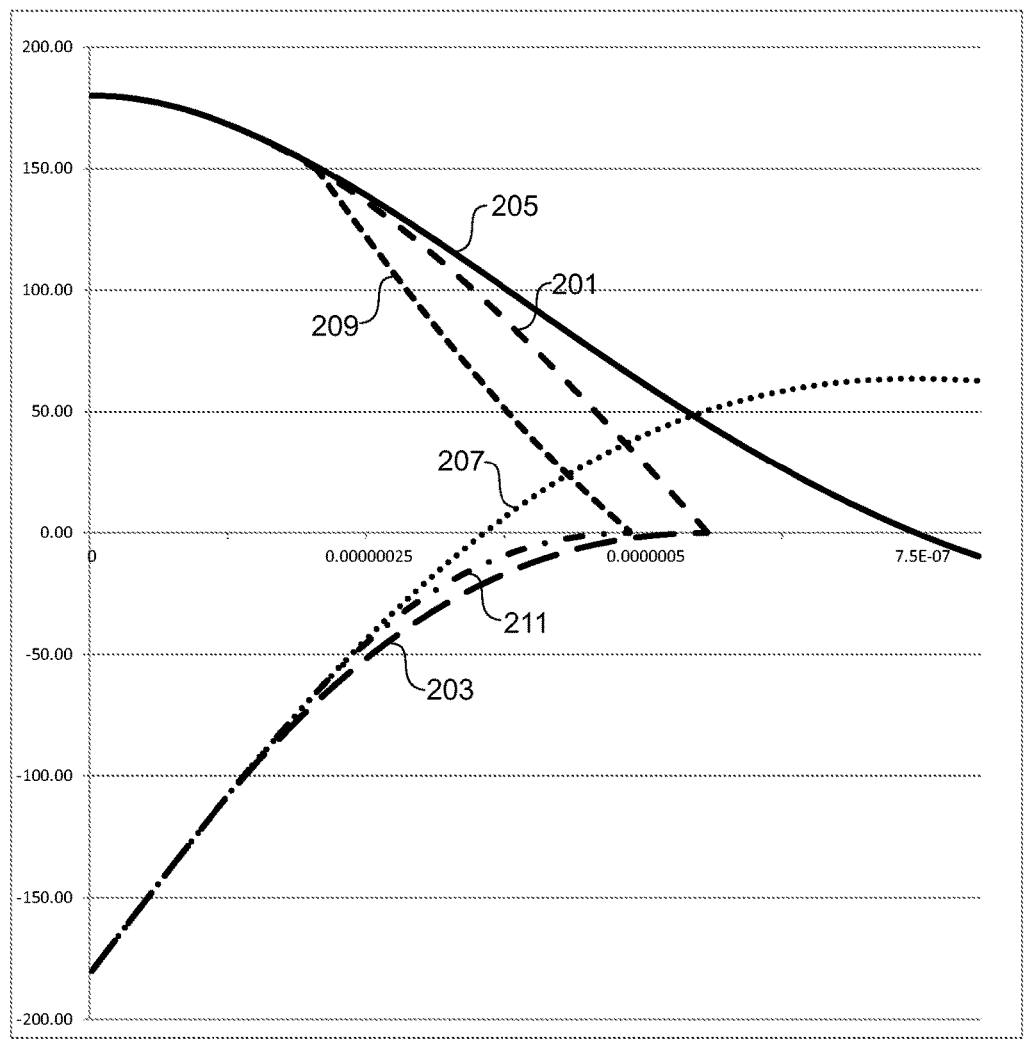
FIG. 8 depicts voltages across the transmit coil and their corresponding current through the transmit coil with and without the implementation of one embodiment of the present invention.

FIG. 8 depicts the effect of having the T/R switch switched on after the commencement of the back-emf decay. A 1000Ω resistor is either permanently connected across the coil, or, may be switched in before the back-emf decay begins and still be switched in when the back-emf is clamped. This may provide extra benefit of saving power. All other parameters of the coil circuit are the same as for FIG. 5 above. Referring back to FIG. 8, t=0 coincides with the commencement of a back-emf decay when the back-emf ceases to be clamped to 180V. Trace 201 shows the voltage across the transmit coil with 86 mA constant current switched on at 0.1 µs. For example, this is effected with a constant current source set at 86 mA, and is switched on 0.1 microseconds after the back-emf decay has commenced, that is, after the diode clamping the back-emf ceases to conduct.

Trace 203 shows the corresponding current through the transmit coil, in mA. Trace 205 shows the voltage across the transit coil when the present invention is not applied and the corresponding current through the transmit coil is depicted as trace 207, but with the 1000Ω resistor connected across the coil which causes substantial under-damping transients.

It should be noted that it is not necessary for one to know when the back-emf ceases in order to implement the present invention, nor have a timer set at the 0.1 microseconds to switch on the T/R switch configured as a constant current source set to 86 mA with a 1000Ω resistor connected across the coil. Rather, a negative feedback loop can be implemented to adjust the non-zero reactive voltage period currents so that the T/R switch happens to turn on at 0.1 microseconds after the back-emf has commenced decaying, and this is controlled through measurement of the coil current at the termination of the back-emf decay, when the voltage across the transmit coil is zero. Were the constant current some other value, e.g. 90 mA, all that would happen is that the negative feedback loop will adjust the conditions so that the switching on of the T/R switch will occur at a different time after the back-emf decay commences so that again, the coil current at the termination of the back-emf decay is zero.

Another example is depicted by traces 209 and 211, which shows the voltage across the transmit coil and the current through the transmit coil respectively, when a 130 mA constant current is switched on at 0.2 µs.

Unlike in FIG. 4, in the two T/R switch example input admittance loads resulting in the waveforms in FIG. 8, the commencement of the back-emf decay at t=0 is due to the 1000Ω resistor "pulling down" the back-emf, and the switching on of the T/R switch occurs at a later time during the back-emf decay period.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

System may be a computer implemented system comprising of a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (e.g. LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

The invention claimed is:

1. A method for reducing unwanted signals, due to a back-emf decay, within a receive signal received by a receive coil of a metal detector during a demodulation of the receive signal after a transmission by a transmit coil of the metal detector, the method comprising:
   generating a repeating transmit signal cycle, each transmit signal cycle comprising a period of non-zero reactive voltage across the transmit coil, followed by a receive period, wherein the period of non-zero reactive voltage across the transmit coil ends after a high-voltage back-emf period within the period of non-zero reactive voltage across the transmit coil, and wherein the back-emf period ends after a period of the back-emf decay within the back-emf period;
   having a transmit/receive (T/R) switch, capable of changing between a less conductive state and a more conductive state, for protecting transmit coil receive electronics from a high voltage across the transmit coil during the period of non-zero reactive voltage across the transmit coil, and for allowing the transmit coil receive electronics to receive the receive signal during the receive period;
   controlling the T/R switch to control a characteristic of the back-emf decay to reduce a duration of the period of the back-emf decay; and
   controlling at least one characteristic of the period of non-zero reactive voltage across the transmit coil such that a current through the transmit coil and a voltage across the transmit coil approach zero at a same time when the back-emf decay ends to reduce the unwanted signals during the demodulation of the receive signal.

2. The method of claim 1, wherein the receive period is a period of zero current through the transmit coil.

3. The method of claim 2, wherein the transmit coil and the receive coil are the same coil.

4. The method of claim 1, wherein the T/R switch changes from the less conductive state to the more conductive state at the commencement of the period of the back-emf decay.

5. The method of claim 1, wherein an output of the T/R switch is connected to a resistor whose resistance is selected to produce approximate critical damping when the T/R is in a more conducting state.

6. The method of claim 1, wherein an input admittance of the transit-receive switch maybe linear or non-linear.

7. The method of claim 1, further comprising:
   having a negative feedback loop which uses, as an input, a signal derived from an output of the T/R switch measured during a period shortly after or immediately following the end of the back-emf decay, to control at least part of the non-zero reactive voltage across the transmit coil.

8. The method of claim 1, wherein each transmit signal cycle comprises two or more time-separated non-zero reactive periods; and a different negative feedback loop associated with each of the two or more different non-zero reactive periods.

9. The method of claim 7, wherein the input to the negative feedback loop includes a demodulation function that demodulates during the receive period, wherein the demodulation function is selected to be approximately balanced to one or both of log-uniform resistive viscous remanent magnetism soil components and uniform conductive half-space soil components.

10. The method of claim 9, wherein the demodulation function is balanced to d.c. signals.

11. The method of claim 1, wherein the T/R switch is isolated from the transmit coil receive electronics.

12. The method of claim 1, further including:
   measuring a current through the transmit coil at the beginning of the receive period in a cycle to control the duration of the period of non-zero reactive voltage in a subsequent cycle such that the current at the beginning of the receive period is substantially zero for the demodulation of the receive signal.

13. The method of claim 1, further including:
   substantially short-circuiting the transmit coil for a short-circuit period after the period of non-zero reactive voltage before the demodulation of received signal; and
   measuring a current through the transmit coil after the short-circuit period in a cycle of the repeating transmit signal cycle to control a subsequent cycle such that the current through the transmit coil after the short-circuit period is substantially zero for the demodulation of the receive signal.

14. The method of claim 1, wherein the step of controlling the transmit-receive switch includes changing the transmit-receive switch from a less-conducting state to the more-conducting state to initiate the back emf decay.

15. The method of claim 1, wherein the step of controlling the transmit-receive switch includes changing the transmit-receive switch from a less-conducting state to the more-conducting state during the period of the back emf decay.

16. The method of claim 1, wherein an input admittance of the transit-receive switch is selected to control a characteristic of the back emf decay.

17. A metal detector configured to perform the method of claim 1.

18. A non-transitory computer readable medium including instructions to perform the method of claim 1.

\* \* \* \* \*